United States Patent [19]

Wankel

[11] 4,305,424

[45] Dec. 15, 1981

[54] VALVE ASSEMBLY

[75] Inventor: Felix Wankel, Lindau, Fed. Rep. of Germany

[73] Assignee: Alfred Gerber, Zurich, Switzerland

[21] Appl. No.: 130,164

[22] PCT Filed: Dec. 11, 1978

[86] PCT No.: PCT/CH78/00049

§ 371 Date: Aug. 9, 1979

§ 102(e) Date: Aug. 1, 1979

[87] PCT Pub. No.: WO79/00364

PCT Pub. Date: Jun. 28, 1979

[30] Foreign Application Priority Data

Dec. 9, 1977 [CH] Switzerland ............ 15161/77

[51] Int. Cl.³ .................................... F16K 15/14
[52] U.S. Cl. .................. 137/512.15; 137/512.4; 137/851; 137/860

[58] Field of Search ............... 137/512.15, 512.4, 851, 137/860

[56] References Cited

U.S. PATENT DOCUMENTS

| 1,860,163 | 5/1932 | Wyzenbeek | 137/512.4 |
| 3,608,676 | 9/1971 | Wieck | 137/512.4 |
| 3,811,468 | 5/1974 | Bellmer | 137/512.15 |
| 3,882,891 | 5/1975 | Viles et al. | 137/512.15 |

Primary Examiner—William R. Cline
Attorney, Agent, or Firm—Toren, McGeady & Stanger

[57] ABSTRACT

A valve assembly having a cylindrical valve chamber with radially directed inlet orifices and with a circular spring leaf which resiliently seals the orifices and which may be deflected by fluid pressure within the inlet orifices to open the orifices. The spring leaf is configured so that it may deflect to open the valve inlet without deviation from its essentially oval shape.

4 Claims, 3 Drawing Figures

VALVE ASSEMBLY

BACKGROUND OF THE INVENTION

The invention relates to a valve with a cylindrical valve chamber which surrounds a spring leaf curved in a circular manner in the circumferential direction of the valve chamber and whose circumferential region arranged in the area of an intake directed radially to the chamber wall forms the valve closure, so that under the pressure of the medium to be blocked, the spring leaf can be deflected resiliently into an open valve position. Such a valve is particularly suitable as a delivery valve of a rotary piston compressor, because in the axial direction of the compressor it can be given a random length, whilst being very small in its radial direction. In particular, the valve closure can be positioned very close to the inner wall of the rotary piston compressor, so that this leads to a minimum size of the compressor clearance volume.

For a valve of the above type, a spring leaf has already been proposed which is flat in the untensioned state and only assumes a circular shape after fixing in the cylindrical valve chamber by engaging under pretension with the inner wall thereof. The thus oppositely directed ends of the open circular shape are supported in the hook-like ends of a Ω-shaped lift guard on the side of the valve chamber diametrically opposite to the intake. As a result with the valve closed the spring lead arranged in a circular manner engages under spring tension on the inner wall of the valve chamber on a relatively large circumferential region of about 130° on the side of the radial intake, whilst the outlet only fills less than a third to a quarter of this angular range. If this spring leaf is deflected under the pressure of the medium flowing through the intake as a result of the engagement of the spring leaf on both sides of the intake in the circumferential direction, corresponding circumferential regions of the spring leaf are supported on the inner wall of the valve chamber, as a result of which the deflection is limited to a reduced circumferential region of the spring leaf with respect to the intake, so that the deflection is linked with correspondingly high bending stresses which, when the valve is used on a compressor lead to fatigue failures in a relatively short time.

BRIEF SUMMARY OF THE INVENTION

The problem of the present invention is to find a valve of the type indicated hereinbefore, whose spring leaf is exposed to smaller bending stresses during its deflection in the open valve position, so that the risk of fatigue failures is eliminated.

According to the invention, this problem is solved in that in the intensioned state the spring leaf is curved in a circular manner, its diameter is smaller than that of the internal diameter of the valve chamber and in its area diametrically opposite to the intake the spring leaf is held spaced from the inner wall of the chamber, so that its circumferential region forming the valve closure sealingly engages along the edge of the inner wall of the chamber surrounding the outlet, the diameter difference being selected in such a way that after its deflection in the open valve position the spring leaf is spaced on all sides from the cylindrical inner wall of the chamber.

As a result, the spring leaf only engages on the inner wall of the chamber to the extent necessary for the sealing of the valve in the closed position. As is known, a relatively narrow marginal area around the intake, for example 1 mm wide is sufficient for sealing purposes. As there is no contact between the spring leaf and the inner wall of the chamber outside the sealing region on deflection in the open valve position the complete circumferential length of the spring leaf can participate unhindered in the bending deformation, so that the bending stress is correspondingly small. This also prevents the risk of overstressing of the spring leaf due to a too pronounced deflection under excessive pressure of the medium, so that there is no need for a lift guard for limiting the possible deflection.

BRIEF DESCRIPTION OF THE DRAWINGS

The invention is described in greater detail hereinafter relative to the non-limitative embodiment and with reference to the attached drawings, wherein show.

DETAILED DESCRIPTION OF THE PREFERRED EMBODIMENTS

Figure 1:
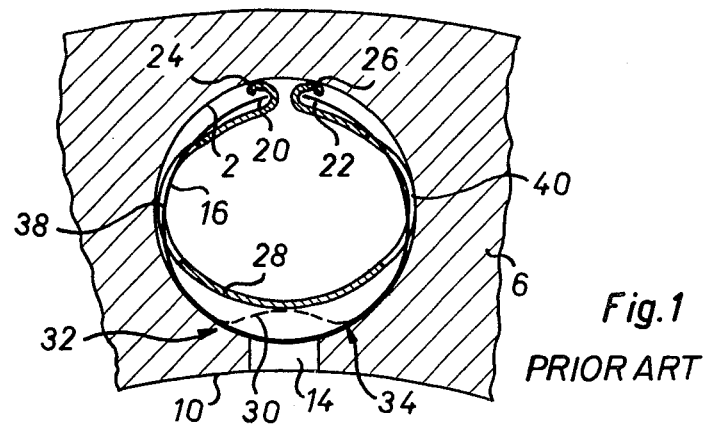
FIG. 1 a radial cross-section through a prior art valve in the closed position, broken lines indicating the spring leaf deformation with the valve open.
Figure 2:
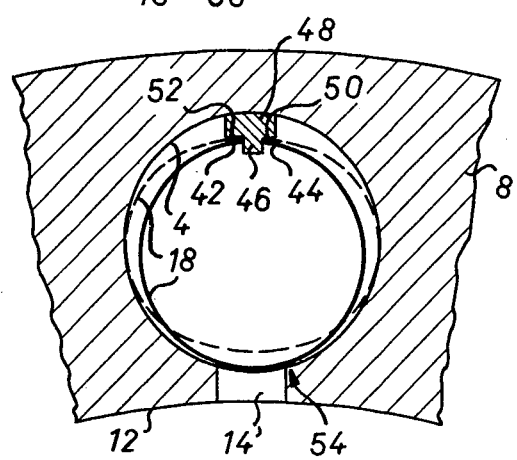
FIG. 2 a view corresponding to FIG. 1 of a valve according to the invention.

In the prior art construction of FIG. 1 and the inventive construction of FIG. 2, the cylindrical valve chamber 2 or 4 is in the form of a cylindrical circular bore of casing surface 6, 8 of a rotary piston compressor and is directed parallel to the rotation axis thereof. A plurality of uniformly spaced, slot-like valve intakes 14, 14' in the form of an axially directed row pass into the valve chamber 2 or 4, as indicated by broken lines 14, 14' in FIG. 3 from the surface path 10 or 12 of the compressor and/or from its compression chamber. It is obvious that a single intake can replace said plurality of intakes. When the valve is closed each intake 14,14' is covered by the circumferential region of a circular spring leaf 16 or 18, which sealingly engages in the area of the inner wall of valve chamber 4 surrounding the openings.

A comparison of FIGS. 1 and 2 shows that in the prior art construction, the spring leaf 16 engages with a relatively larger circumference of the chamber inner wall, this necessarily resulting from the use of a spring leaf 16 which is flat in the untensioned state and which only assumes a circular configuration through its mounting in the cylindrical valve chamber. The free oppositely directed ends 20, 22 are supported on the cylindrical chamber inner wall or in the hook-shaped ends 24, 26 of a Ω-shaped lift guard 28, so that they are directed at an angle to a tangent of the chamber inner wall. It has been found that through the engagement of said spring leaf 16 with a relatively large circumferential region of the chamber inner wall there is support on the latter under the restoring force of the spring leaf and as a result said leaf cannot deflect in an unhindered manner under the pressure of the inflowing medium, so that the deflection is limited to a relatively narrow circumferential region in the vicinity of an intake 14, as indicated by broken line 30 in FIG. 1. Line 30 shows the valve is in its maximum open position in which a further deflection of the spring leaf 16 is limited by the lift guard 28. The inward deflection in a narrow circumferential region leading at this point to a concave shape of the spring leaf causes increased bending stress at points 32, 34 where the spring leaf curvature passes from a convex into a concave shape, resulting in early fatigue failure in the case of prolonged alternating loading when used on a compressor. To make this clearer, the deflection in accordance with line 30 and the maximum open position of the valve have been shown in an exagerated form. However, said overstressing even occurs with deflections of fractions of a millimeter.

After the spring leaf in the region of intake 14 has lifted from the chamber inner wall under the pressure of the compressed medium, the latter can flow radially into valve chamber 2 or 4, whereby it is axially deflected so that it flows through the chamber to an outlet located at one end thereof and which can have the cross-sectional size of the valve chamber. The axial flow takes place in part in the gap between the chamber inner wall and the spring leaf, as well as radially past the laminations 16a to 16e or 18a to 18e of the spring leaf 16 or 18 to the central area of the valve chamber, before finally being axially led away to the outlet. The dividing up of the valve intake into a plurality of slot-like intakes 14, 14' arranged in rows and the gaps 36 between the individual laminations permit the flowing in of the medium to the central area of the valve chamber even when the valve has a relatively large axial extent. In the prior art construction of FIG. 1 it is obvious that lateral slot-like openings 38, 40 are provided in lift guard 28 through which extend in an arcuate manner the individual laminations of spring leaf 16.

Figure 3:
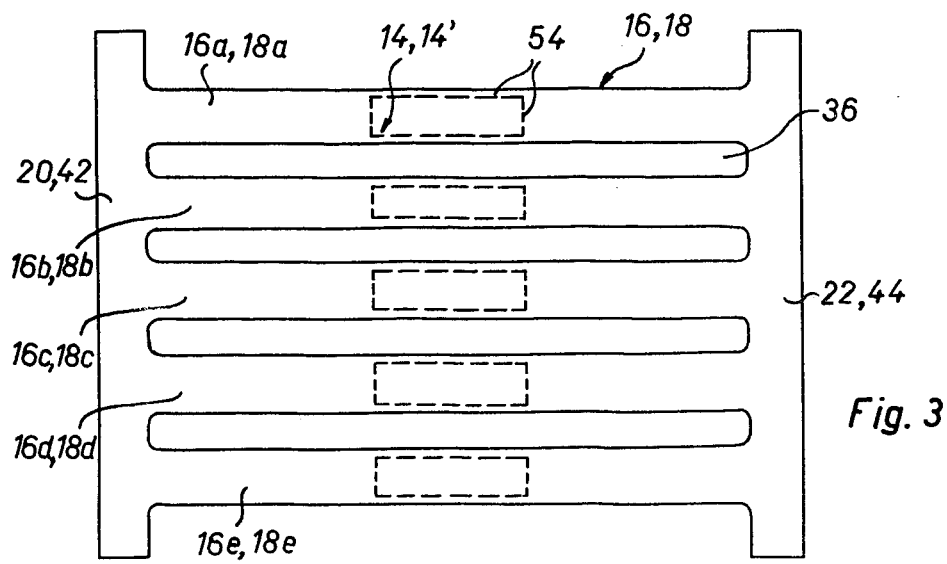
FIG. 3 a plan view of a spring leaf uncoiled flat, the position of the valve intake relative to the spring leaf being indicated by broken lines.

The valve according to the invention of FIG. 2 fundamentally operates in the same way as that of FIG. 1, but it has a differently shaped and dimensioned spring leaf 18, having a different deformation behaviour. Even in the untensioned state, i.e. before incorporating into the cylindrical valve chamber 4, the spring leaf 18 is shaped like a cylindrical sleeve with an axial slit bounded by the oppositely directed leaf ends 42, 44. However, when uncoiled flat the spring leaf 18 can have the same shape as the spring leaf 16 of the valve of FIG. 1, as shown in FIG. 3. In the fitted state, the axial slit is expanded somewhat, so that the leaf ends 42, 44 embrace under pretension a web-shaped projection 46 of a spacer 48 fixed to the inner wall of valve chamber 4 diametrically opposite to the row of openings 14'. The outer circumferential surface of leaf ends 42, 44 engage with limited pretension on the surfaces 50, 52 of spacer 48 running on both sides to the web-like projection 46 and with this pretension the area of the spring leaf facing the axial slit sealingly engages on the rim 54 surrounding openings 14' and therefore on the inner wall of the chamber. As soon as a pressure acts in intakes 14 which is greater than the pressure in the valve chamber 4 and the contact pressure of the spring leaf, the latter rises from rim 54, so that it is only in contact with spacer 48. It is not possible to prevent the deformation of the circular spring leaf due to engagement on the chamber inner wall, because the spring leaf diameter is smaller than the cylindrical valve chamber diameter. In FIG. 2 the shape of the spring leaf 18 when the valve is open is indicated by a broken line. A lift stop is not necessary because in the case of too great a deformation of the spring leaf, the latter is supported on the chamber inner wall on two opposite sides and the arcuate spring leaf portion between the support points forms a high resistance to further deformations.

It is obvious that in the untensioned state, the spring leaf can have different circular shapes and the valve chamber can also have different cross-sectional shapes, such as e.g. elliptical, oval, etc. It is important that the spring leaf only engages with the chamber inner wall along the opening rim 54 permitting an elastic deformation of the spring leaf which is not impeded by the chamber inner wall. This reliably obviates the disadvantages of a valve according to FIG. 1. Although it is not necessary, a lift stop can also be used in the valve according to the invention. The spring leaf can be made from steel sheet material, whose thickness is such that over the intakes 14' it does not deform in a non-circular shape.

What is claimed is:

1. A valve assembly comprising: circumferential wall means defining a generally cylindrical valve chamber; inlet orifice means opening into said cylindrical chamber through said circumferential wall means; outlet means for said valve chamber; a valve member comprising a circular spring leaf having a contour generally similar to the contour of said circumferential wall means and arranged to extend circumferentially within said valve chamber; said spring leaf including a part thereof extending continuously over said inlet orifice means and into abutting engagement with parts of said circumferential wall means adjacent said orifice means to block fluid flow therethrough into said valve chamber; said spring leaf being arranged to be resiliently deflected by fluid pressure in said inlet orifice means to be lifted out of blocking engagement with said circumferential wall means to open said inlet orifice means when in said deflected state under the influence of said fluid pressure and to resiliently close said inlet orifice means when said fluid pressure is below a given limit; means operatively mounting said spring leaf within said valve chamber at a point thereon diametrically opposite to said part of said spring leaf extending over said inlet orifice means; said spring leaf being configured so that when undeflected by said fluid pressure its diameter is smaller than that of the internal diameter of said valve chamber and so that its circumferential region forming said part thereof extending over said inlet orifice means sealingly engages along an edge formed in said circumferential wall means surrounding said inlet orifice means; the diameter difference being selected in such a way that after its deflection by said fluid pressure to open said inlet orifice means, said spring leaf is spaced on all sides from said circumferential wall means.

2. A valve assembly according to claim 1 wherein said circular spring leaf is formed with a discontinuous circumferential configuration bounded by a pair of opposed leaf ends defining therebetween an axially directed slot and wherein said means mounting said spring leaf comprise a mounting member projecting from said circumferential wall means having said opposed leaf ends attached thereto with said opposed leaf ends being maintained in a position spaced from each other.

3. A valve assembly according to claim 2 wherein said inlet orifice means comprise a plurality of inlet orifices axially juxtaposed in a row extending in the longitudinal direction of said circumferential wall means, wherein said part of said spring leaf extending over said inlet orifice means comprises a plurality of laminations each associated with one of said orifices and wherein said mounting member is formed with a T-shaped cross-sectional configuration affixed to said circumferential wall means diametrically opposite to said row of inlet orifices and extending generally parallel thereto.

4. A valve assembly according to claim 3 wherein when said assembly is in the closed condition said leaf spring is in contact with said circumferential wall means over a width of less than 4 mm taken circumferentially of said wall means on both sides of said inlet orifices.

* * * * *